Jan. 22, 1957

A. C. RAMSEY 2,778,534

LIQUID DISPENSING MACHINE

Filed June 8, 1953

INVENTOR.
Arthur C. Ramsey
BY
ATTORNEY.

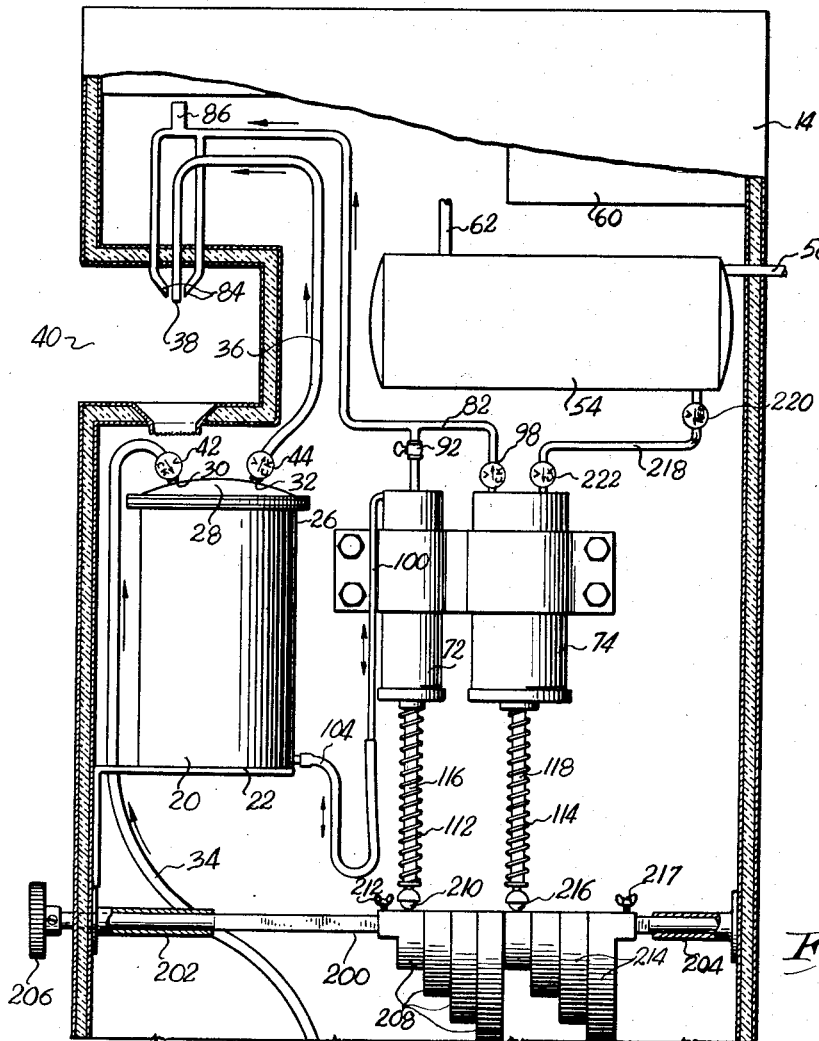

Jan. 22, 1957  A. C. RAMSEY  2,778,534
LIQUID DISPENSING MACHINE
Filed June 8, 1953  3 Sheets-Sheet 3
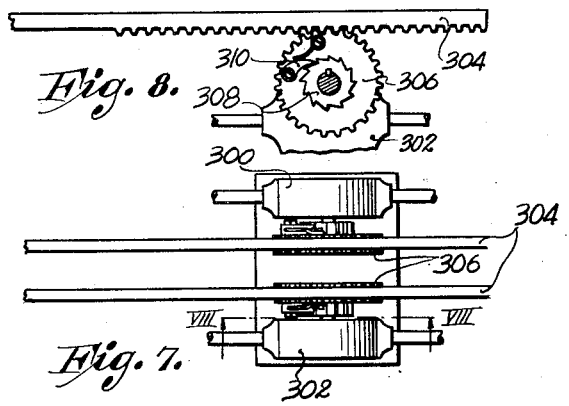
Fig. 8.
Fig. 7.
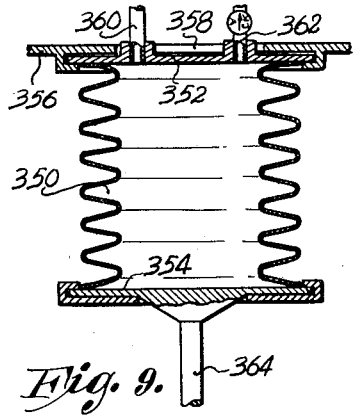
Fig. 9.
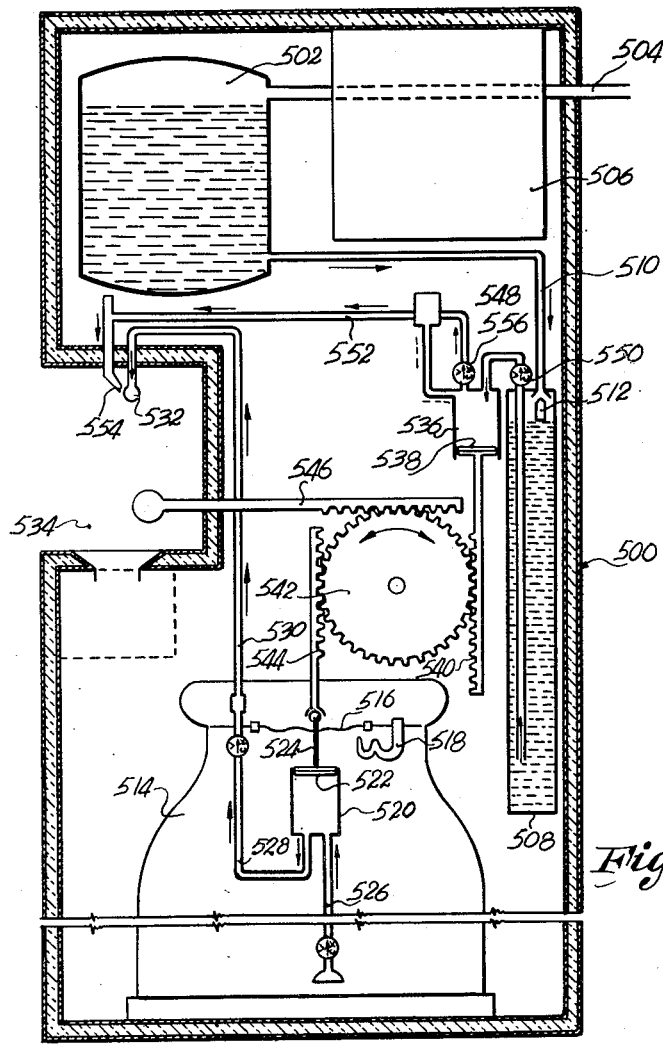
Fig. 12.
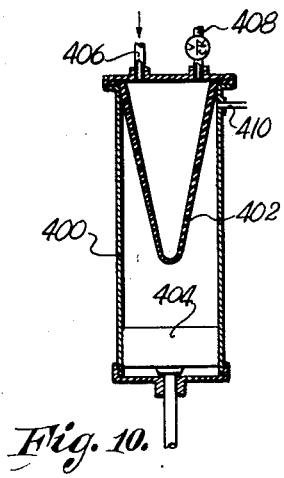
Fig. 10.
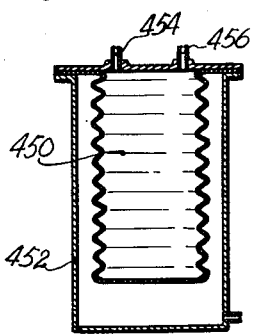
Fig. 11.
INVENTOR.
Arthur C. Ramsey
BY
ATTORNEY.

United States Patent Office 2,778,534
Patented Jan. 22, 1957

2,778,534

LIQUID DISPENSING MACHINE

Arthur C. Ramsey, Fort Bliss, Tex.

Application June 8, 1953, Serial No. 360,077

12 Claims. (Cl. 222—129.4)

This invention has to do with dispensing machines and more particularly with apparatus for conveying liquids to a dispensing station forming a part of the assembly, the primary object being to automatically discharge predetermined amounts of one or more liquids into a receptacle such as a cup, and at the same time maintain a completely sanitary condition so that the machine will meet all health requirements such as those that are laid down by laws, regulations, ordinances and the like.

It is the most important object of the present invention to provide a liquid dispenser capable of handling virtually any type of beverage, but particularly adapted for dispensing milk in that the machine is characterized by its capability of maintaining a sanitary condition at all times and, therefore, meeting all health requirements which are necessarily strict and rigidly enforced by all health departments.

It is an extremely important object of this invention to provide a machine for dispensing milk and other products requiring the maintenance of sanitary conditions wherein the milk itself is caused to flow from a container to a point of use in a closed pumping system that is not subjected to contamination throughout the period of time the machine is in use to evacuate the container of its contents, the pumping means being in the form of a flexible and therefore, collapsible bag-like membrane or liner capable of drawing the milk from the container and expelling it forcibly into a cup or the like as the bag member is alternately expanded and contracted.

Another important object of this invention is to provide a machine that is usable to dispense concentrated milk and to simultaneously feed a predetermined quantity of water in a receiving cup or other receptacle, the two pumping means operating simultaneously and each operating under sanitary conditions, rendering the machine adaptable for public use, either as a dispenser in cafes, restaurants, milk bars, kitchens, galleys and mess halls of the armed services, or as a vending machine in public establishments generally through the provision of suitable coin controlled mechanism as is commonly employed in the vending of articles of merchandise.

A further object of this invention is to provide a liquid dispensing machine wherein the ingredients are handled in a sanitary manner and in the case of milk particularly, there is provided the aforementioned collapsible bag into which the milk is drawn from a container to which it is connected, the bag, its connecting conduits, valves and other component parts being preferably housed within the container at the point of filling, whereby the dispensing machine is serviced merely by placing the container therein, clamping the flexible bag in place within the structure for actuating the same and connecting the outlet conduit of the bag so that the milk discharged therefrom is caused to flow to a dispensing station forming a part of the machine.

A still further object of this invention is to provide in a dispensing machine for milk or other products requiring the maintenance of sanitary conditions, structure for collapsing and expanding the flexible membrane which makes no phyical contact with the product whatsoever whereby the milk is caused to flow through a completely closed system from the container therefor into the cup so that it has no opportunity to become contaminated and cannot therefore, be deemed objectionable in any manner whatsoever by health authorities or by the public generally.

It is an important aim of the present invention to provide a machine for automatically dispensing concentrated milk and water simultaneously and in predetermined ratios, and which machine may be quickly and easily converted so as to eliminate the discharge of water if desired so that only the concentrated milk is discharged, and to the end further, that the machine is rendered usable for dispensing or vending liquids other than concentrated milk if desired.

An important aim of this invention is the provision of a machine of this class having structure forming a part thereof permitting the discharge of two or more liquids simultaneously and in predetermined amounts, and wherein such structure is selectively variable so that the ratio of one liquid to another may be changed as desired and the machine, therefore, made universally adaptable for various and sundry uses aside from the handling of concentrated milk as primarily intended.

A further object of this invention is to provide a novel arrangement for accomplishing the pumping action of the flexible bag which includes the pumping of water into and out of a container for the bag, and wherein the source of such water is the same as that which is used to dilute the concentrated milk during each cycle of operation.

Other objects include the way in which fluid displacement methods are employed in the dispensing machine hereof to not only actuate the flexible bag, but to pump predetermined quantities of water or other liquid; the way in which the water, as well as the concentrate, are maintained in a refrigerated condition; the manner of forming and constructing the bag itself for efficient performance so that the amount of liquid dispensed thereby is the same as the amount of liquid displacement utilized to produce a pumping action in the bag; the way in which the collapsible bag is made so as to permit disposing of the same each time a fresh supply of concentrate is placed in the machine; and many more objects including important details of construction of the water pumping assembly, as well as the membrane-type of pump for the primary invredient of the beverage, all of which will be made clear as the following specification progresses.

In the drawings:

Fig. 3 is a fragmentary, schematic, cross-sectional view similar to Fig. 1, illustrating a liquid dispensing machine made pursuant to this invention and incorporating various modifications not only in the manner of actuating the piston-type pumps, but in supplying water thereto.

Fig. 4 is a schematic view partially in section illustrating a modified form of pump means.

Fig. 5 is a fragmentary, elevational view partially in section showing a modified form of discharge nozzle.

Fig. 6 is a cross-sectional view taken on line VI—VI of Fig. 5.

Fig. 7 is a fragmentary view showing a modified form of water pumping means.

Fig. 8 is a fragmentary, cross-sectional view taken on line VIII—VIII of Fig. 7.

Fig. 9 is a sectional view showing a modified bag and actuating means therefor.

Fig. 10 is a sectional view showing another form of flexible bag and means to expand and contract the same.

Fig. 11 is a cross-sectional view illustrating a still further embodiment of flexible bag structure; and Fig. 12 is a schematic, cross-sectional view similar to Fig. 1 showing another embodiment of the liquid dispensing machine of this invention.

Figures 1, 2:
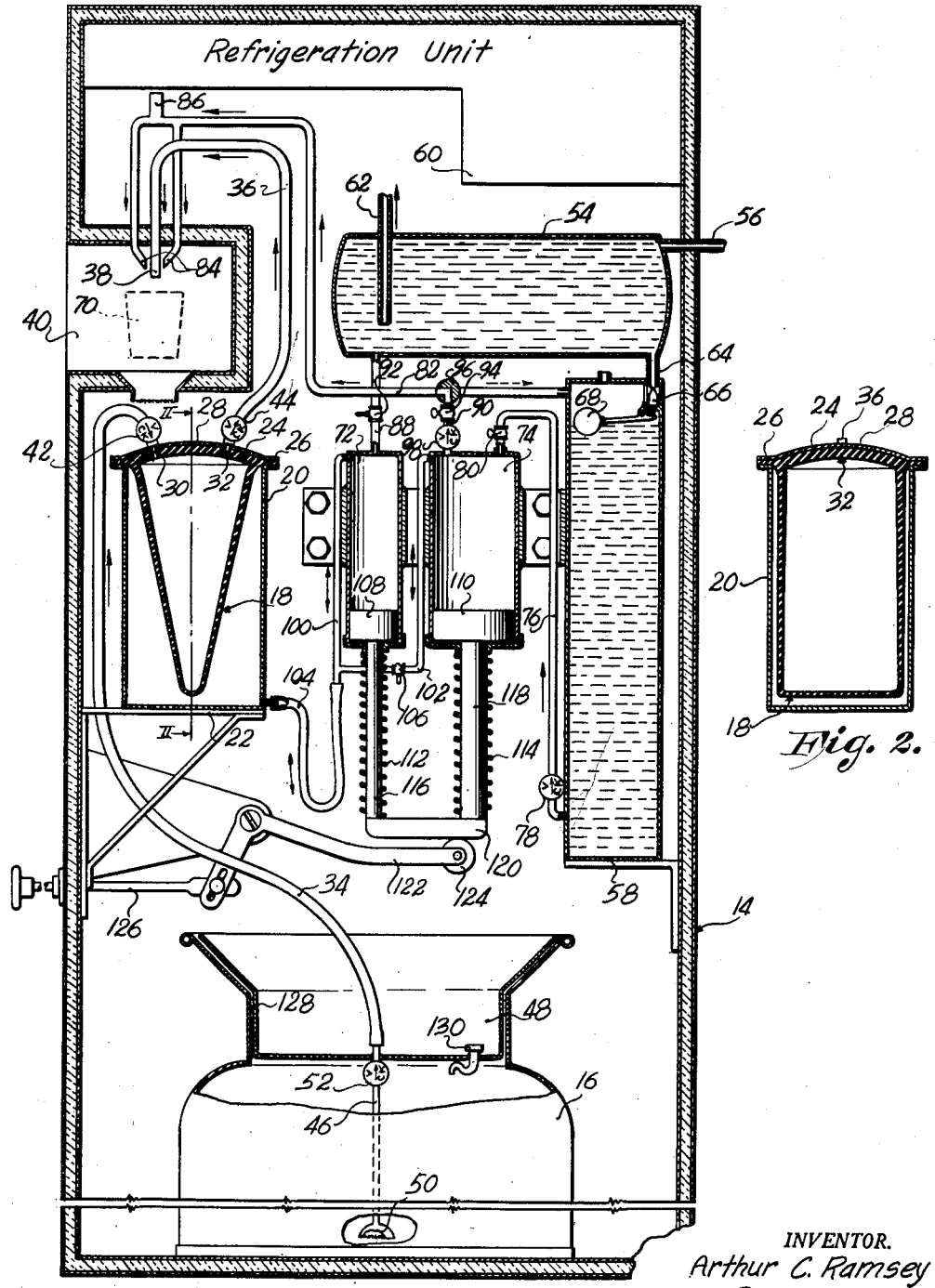
Figure 1 is a schematic, vertical, cross-sectional view through one form of liquid dispensing machine made according to the present invention.
Fig. 2 is a detailed, cross-sectional view taken on line II—II of Fig. 1.

In recent years much has been done in the production of concentrated milk, and while this product is not as yet commonly known, it has many advantages and its uses might well be extended indefinitely if satisfactory means could be provided for dispensing the same. The product is made from fresh whole milk by removing from two-thirds to three-fourths of the water content thereof under a sufficiently high vacuum to cause the same to boil, but at a relatively low temperature so as to avoid a cooked or caramelized flavor in the end product. Experiments have proved that when reconstituted by reintroducing a like amount of water thereinto, the milk so formed cannot be differentiated from pasteurized fresh whole milk so far as taste is concerned.

This process of concentrating milk greatly extends its keeping qualities, and if the concentrate is maintained at a temperature between 32° F. and 36° F., it will keep for fifteen to thirty days. The concentrate can also be frozen and held below 5° F. for approximately 90 to 120 days.

Other advantages include the reduction in cost of transportation since the process may be carried out where milk is available at low cost and shipped to points of use where it will compete favorably with whole milk produced locally or shipped in from milk sheds or areas where the dairy industry is a primary industry.

Making milk available to the armed services throughout the world is another problem that can be met through the use of concentrated milk provided that it can be dispensed properly and consumed rather quickly since once the concentrate has been reconstituted it loses its keeping qualities. No convenient, sanitary means has heretofore been provided to render the development of the field of concentrated milk practical so as to meet the problem of making milk available to the armed services and to communities where dairy products are not abundant, and therefore, as will hereinafter appear, the dispensing machine hereof, while capable of many other uses, is primarily adapted for handling such concentrate and for reconstituting the same so that whole milk may be quickly, easily and inexpensively dispensed without danger of contamination.

One form of machine for carrying out the above objects is illustrated in Figs. 1 and 2 of the drawings and includes an insulated cabinet broadly designated by the numeral 14, and which may take any form desired but which must necessarily be provided with an access door or doors (not shown) not only for the purpose of permitting insertion and removal of containers 16, but to permit operation of the various controls hereinafter set forth and to permit insertion and removal of bags such as indicated by the numeral 18 in Figs. 1 and 2.

The bag or bag-like membrane or liner 18 is made from rubber, plastic or other preferably non-porous and therefore, impermeable, flexible material having the shape shown in Figs. 1 and 2 and capable of being inserted into and rigidly attached to a hollow, open top container 20, suitably mounted within the cabinet 14 by a support 22.

As noted in Fig. 1, bag 18 is preferably V-shaped in at least one direction, progressively diminishing therefore in width as the lowermost end thereof is approached, and top wall 24 forming a part of the bag 18, closes the same and is integrally joined therewith. The dome-shaped top wall 24 of the bag 18 is provided with a continuous external and integral flange 26 that is clamped in place on the container 20 by the provision of a lid 28 for the container 20 and that is removably attached thereto in any suitable manner not illustrated. It is to be preferred further that the thickness of the bag 18 progressively decrease as the lowermost apex end thereof is approached and that the lid 28 effectively seals the container 20 rendering the latter adaptable to receive water or other fluid operating to apply external pressure to the bag 18 and thereby alternately expand and contract the same.

Nipples 30 and 32 preferably molded rigidly in the wall 24 extend through the lid 28 and receive conduits 34 and 36 respectively, the latter terminating in a nozzle 38 that projects into a dispensing station 40 forming a part of the cabinet 14. A check valve 42 in the conduit 34 permits the flow of liquid into bag 18 and another check valve 44 in the conduit 36 permits the flow of liquid from the bag 18. The conduit 34 is joined with a pipe or the like 46 that extends through a hollow lid 48 for the container 16 and terminates adjacent the lowermost end of the container 16 in a suitable strainer 50. The pipe 46 is provided with a check valve 52 that permits the flow of liquid from the container 16 into the tube 34.

It is contemplated, particularly when the container 16 is utilized for receiving concentrated milk, that at the time of filling the container 16, the bag 18 and the conduits 34 and 36 be housed within the lid 48 and that in servicing the machine, it shall be necessary only to place the container 16 therein, remove the bag 18 from the lid 48, insert it into the container 20 and, of course, clamp the same in place and position the conduit 36 in place so that it will discharge into the dispensing station 40.

A water storage tank 54 within the cabinet 14 may be coupled with a source of water under pressure by a line 56 and the water in tank 54, as well as water in a tank 58 and the concentrate in the container 16, may be kept at a proper temperature through use of a refrigerating unit 60 suitably mounted in the compartment 14. If desired, water flowing into the tank 54 may be pre-cooled by a suitable coil assembly forming a part of the unit 60. Additionally, cold water may be made available by means of an outlet tube 62 communicating with the tank 54 and and extending to an accessible point exteriorly of the cabinet 14.

The tank 58 is coupled with the tank 54 for gravitational flow of water from the tank 54 into the tank 58 by a short pipe 64 having a valve 66 therein that is in turn controlled by a float 68 in the tank 58.

Structure for contracting and expanding the bag 18 and for pumping water into a cup or other receptacle 70 disposed in the receiving station 40 simultaneously with the flow of concentrate from nozzle 38, includes a pair of side-by-side cylinders 72 and 74 housed wtihin the cabinet 14. The cylinder 74 communicates with the tank 58 by a pipe 76 having a check valve 78 therein, permitting the flow of water from the tank 58 to the cylinder 74 and provided also with a normally open shut-off valve 80 between the valve 78 and the cylinder 74.

A flow line 62 extending from the tann 58 terminates in a pair of nozzles 84 within the dispensing station 40, and is provided with a small expansion chamber 86 for purposes hereinafter to be made clear. A pipe 88, having a normally closed shut-off valve 92 joins tank 54 and cylinder 72. The line 82 communicates with cylinder 74 by a branch 90, provided with a normally open shut-off valve 94. A valve 96 between line 82 and branch 90 may be set as shown in Fig. 1 for flow of water from the cylinder 74 to the nozzles 84 or for flow of water from the cylinder 74 to the tank 58. A check valve 98 in the branch 90 between the cylinder 74 and the valve 94 permits the flow of water from the cylinder 74 through the branch 90 and thence into the line 82.

Pipes 100 and 102 communicating with cylinders 72 and 74 respectively, are joined to the container 20 by a common conduit 104, the pipe 102 having a normally closed shut-off valve 106 interposed therein.

Vertically reciprocable pistons 108 and 110 for cylinders 72 and 74 respectively, are yieldably biased to the lowermost ends of their paths of travel as illustrated, by springs 112 and 114 coiled about their stems 116 and 118 respectively, that are in turn interconnected by a bar 120. Any suitable means may be provided for raising the pistons 108 and 110 in their cylinders 72 and 74 and for purposes of illustration there is shown a bell crank 122 swingably mounted in the cabinet 14 and provided with a roller 124 engaging the bar 120. A reciprocable plunger 126 is operably coupled with the crank 122 for swinging the same and, in this respect, it may now be appreciated that the machine hereof is easily adapted for automatic operation by the provision of coin controlled mechanism as aforementioned, operably coupled with a plunger such as at 126 and/or a crank or the like as at 122 for raising the pistons 108 and 110.

Assuming the container 20 (exteriorly of the bag 18), conduit 104, pipe 100 and cylinder 72 to be full of water, operation of the dispensing machine of Figs. 1 and 2, is as follows.

When the plunger 126 is depressed inwardly to swing the crank 122 and thereby move the roller 124 upwardly, pistons 108 and 110 will rise simultaneously and the water content of cylinder 72 will be displaced into the container 20, thereby contracting or collapsing the flexible bag 18. Upon release of the plunger 126, springs 112 and 114 will return the pistons 108 and 110 to the lowermost ends of their paths of travel and such downward movement of the piston 108 will draw the water back into the cylinder 72, thereby expanding the bag 18 to the condition shown in Figs. 1 and 2. The suction created by the expanding bag 18 will draw concentrate from the container 16 through the pipe 46, past the valve 52, through the conduit 34 and past valve 42 into the bag 18. The amount of liquid that flows from the container 16 into the bag 18 will be substantially the same as the amount of water displaced by the piston 108 from the cylinder 72 when the piston 108 moves upwardly to the uppermost end of the cylinder 72.

Thereafter, each time the piston 108 is actuated it will alternately contract and expand the bag 18, expelling concentrate from the bag 18, past valve 44 into the conduit 36 and thence through the nozzle 38 into the receptacle 70 each time the piston 108 rises and drawing a predetermined quantity of concentrate from the container 16 per unit of piston travel or per unit of pumping action for discharge into the bag 18 each time the piston 108 descends in the cylinder 72.

Similarly, each time the piston 110 descends in the cylinder 74, it will draw water from the tank 58 through the pipe 76, past valves 78 and 80 and each time the piston 110 ascends in the cylinder 74, it will force a predetermined quantity of water from the cylinder 74, through the branch 90, past valves 98, 94 and 96 into the line 82, and thence to the nozzles 84 for discharge into the cup 70 simultaneously with the flow of milk concentrate from the nozzles 38. Whenever water is drawn from the tank 58 the supply thereof will be replenished from the tank 54 by automatic operation of the float 68 and valve 66.

When the pressure in the line 82 is relieved at the time piston 110 arrives at the uppermost end of its path of travel, water collected below the expansion chamber 86, will be forced to the nozzles 84 after the flow of milk concentrate from the nozzle 38 has ceased, and since nozzles 84 are directed toward the nozzle 38, the latter will be cleansed and the milk concentrate not permitted to collect thereon for contamination during periods when the machine is idle.

In the event that it is desired to draw only from the container 16 without an accompanying flow of water into the receptacle 70, it is but necessary to manipulate the valve 96 so that the water displaced from the cylinder 74 by upward movement of the piston 110, will by-pass from the branch 90 to the line 82, and thence into the tank 58 rather than flow through the line 82 to the nozzles 84 each time the plunger 126 is manipulated.

Furthermore, if it is desired to utilize both pistons 108 and 110 to pump liquid from the container 16 and to dispense the liquid in an undiluted condition, it is but necessary to close the valves 80 and 94 and open the valve 106. When the plunger 126 is depressed, water will flow into the conduit 104 and thence into the container 20, not only from the cylinder 72 by way of pipe 100, but from the cylinder 74 by way of pipe 102. The amount of liquid discharged through the nozzle 38 during each operation will, therefore, be equal to the combined amount of liquid displaced by pistons 108 and 110 from cylinders 72 and 74 respectively.

A seal 128 around the lid 48 prevents entrance of air into the container 16 and the vacuum that is produced in the container 16 by expansion of bag 18 will be compensated for by in-flow of air through an air filter 130 in the lid 48. Filter 130 is sterilized and installed at the milk processing plant. The uppermost end of the filter body is closed by a removable cap so as to prevent contamination from exterior sources during shipment and in case of upset during shipment, to prevent the entrance of milk into the lower interior portion of the filter by preventing the escape of any air from the body of the filter. Milk cannot escape from the filter 130 because the same is provided with a small interior opening and its provision exploits to the utmost the inherent keeping qualities of the concentrate. By filtering out the bacteria carrying dust, the filter 130 greatly reduces the number of bacteria that would otherwise enter the container 16.

Bag 18 may conceivably either be cylindrical or spherical if desired, or elliptical in cross-sectional contour, and the thinning of the walls thereof as the lowermost end is approached, pre-disposes bag 18 to a collapsing action that begins toward the bottom and gradually works upwardly toward the outlet 32. However, the shape of the bag 18 herein illustrated, helps prevent air pockets between the bag 18 and the container 20 that would tend to interfere with positive and immediate displacement of milk from the bag 18. To this end further, the body of the bag 18 is of such weight and material that it will generally retain its shape when inserted into the container 20, thus precluding the formation of deep wrinkles or indentations that might entrap air.

When an old bag 18 is removed from the container 20, and a new bag 18 reinserted thereinto, the valve 92 is opened and a small quantity of water is allowed to enter the cylinder 72, after which valve 92 is reclosed. Pistons 108 and 110 are thereupon reciprocated until all air in the pipe 100 and conduit 104 is expelled. When a new bag 18 is inserted, an overflow of water as lid 28 is clamped down on the container 20, shows that all the air has been expelled from the system.

It is particularly notable that the container 16 is located at the bottom of the cabinet 14 to facilitate replacement. A conventional ten gallon milk can has been chosen for illustration and because of its weight when filled with concentrate, the fact that it may be rolled into place on its lowermost rim, greatly facilitates servicing of the machine. Manifestly, other types of containers may be used however, but in any event, the arrangement of the component parts of the machine so as to avoid the necessity of lifting the heavy cans, is of great importance.

In the form of my invention illustrated in Fig. 3 of the drawings, the same designating numerals for the component parts of the machine shown in Fig. 1, are utilized in Fig. 3 except so far as the two forms of the invention differ in construction and operation.

In Fig. 3 of the drawings, the bar 120 interconnecting the stems 116 and 118 has been eliminated and a differing type of actuating mechanism has been provided. A squared, rotatable shaft 200 is carried by a pair of opposed bearings 202 and 204 within the cabinet 14 and has an actuating knob 206 thereon exteriorly of the cabinet 14. A plurality of cams 208 eccentrically mounted on the shaft 200 and having varying diameters, may be selectively aligned with the stem 116 for engagement with a roller 210 on the latter by reciprocating the same along shaft 200 after loosening setscrew 212.

An identical arrangement is provided for the stem 118 and includes a plurality of cams 214 selectively engageable with a roller 216 on the stem 118 upon loosening setscrews 217. As shown, the cams 208 and 214 will raise stems 116 and 118 equal distances upon rotation of knob 206, 180° but such distances may be varied as desired by shifting the two sets of cams relatively on the shaft 200.

The form of Fig. 3 differs from the modification shown by Figs. 1 and 2 additionally by the elimination of tank 58, pipe 76, and valves 78, 80, 90 and 96. Instead, tank 54 is coupled directly with the cylinder 74 by a line 218 having a reducing valve 220 and a check valve 222 therein. In this modification the cylinders 72 and 74 may well be identical in size since the ratio of milk to water may be varied to suit the desires of the operator by manipulation of the two shafts 200. When the cams 208 and 214 are in the position shown in Fig. 3 of the drawings, simultaneous rotation of both shafts 200 will raise the stems 116 and 118 equal amounts, and if the cylinder 72 is one-half the size of cylinder 74, twice as much water will be expelled through the line 82 than milk through conduit 36. Each time the stem 118 descends, water will flow into the cylinder 74 by way of line 218, past valves 220 and 222. By varying the positions of the cams 208 and 214 relative to their corresponding rollers 210 and 216, the ratio of water to milk is rendered variable.

In lieu of a piston-cylinder arrangement, including cylinders 72 and 74 and their corresponding pistons 108 and 110, expansible bellows-type pumps 250 and 252 such as illustrated in Fig. 4 of the drawings, may be utilized. Stems 254 and 256 may be joined by a bar 258 for simultaneous contraction and expansion of the pump means 250 and 252 by a crank 260 and roller 262 as in Fig. 1, or the actuating means illustrated by Fig. 3 may be utilized to operate such expansible pumping devices.

In Fig. 4 of the drawings, branches 264 and 266 correspond to branches 88 and 90, pipes 268 and 270 correspond to pipes 100 and 102, and pipe 272 corresponds to pipe 76 in Fig. 1. In all respects therefore, the modification of Fig. 4 will operate the same as above described relative to the modifications of Figs. 1 and 3 of the drawings.

During long periods of nonuse such as between meals or over-night, it is desirable to insulate the nozzles 38 and 84 from outside room temperature, and to this end an insulated cup (not shown) may be releasably mounted on the top wall of the station 40 in housing relationship to such nozzles. Additionally, the nozzle 38 may be made as illustrated in Figs. 5 and 6 of the drawings.

This nozzle 280 for conduit 282 that corresponds to conduit, is flattened as at 284 and 286 to form a slit-like opening that normally remains closed or nearly closed to prevent dripping of the milk in the station 40 during nonuse. When the fluid in the conduit 36 is placed under pressure the flattened nozzle 280 will spread open and the contents will be discharged in a relatively wide, thin stream.

Gear pumps 300 and 302 (Figs. 7 and 8) may be used in lieu of the cylinders 72 and 74 in Fig. 3, if desired and be actuated by racks and pinions 304 and 306 respectively, but the gear pump for dispensing water should be prevented from retrograde movement when the corresponding rack is returned to the beginning of its path of travel. Overrunning clutches, ratchets or the like may be utilized for this purpose and, therefore, there is shown in Fig. 8 a ratchet 308 cooperating with a spring-loaded pawl 310.

By following the teachings of Fig. 9 of the drawings, it is possible to eliminate the container 20, bag 18 and the actuating means for the latter which includes the piston 108 and cylinder 72. To this end a flexible bag-like membrane of the bellows-type, designated by the numeral 350, capable of being disposed of each time a new container 16 is placed in the machine, is mounted between and rigidly secured to a pair of plates 352 and 354 which may be integral with membrane 350 if desired. Plate 352 may be removable secured to a stationary wall 356 in the cabinet of the machine and provided with a clearance opening 358 for conduits 360 and 362 corresponding to conduits 34 and 36. Plate 354 is removable secured to a reciprocable stem 364 corresponding to stem 116.

The bag assembly 18 and the cylinder structure 72 of Figs. 1 and 3, may be combined if desired according to the construction illustrated by Fig. 10 of the drawings. A receptacle 400 for receiving a bag 402 may take the form of a cylinder similar to cylinder 72 and a piston 404 reciprocably mounted therein performs the same function as piston 108 in compressing and expanding the bag 402. In this modification the milk concentrate flows into the bag 402 by a conduit 406 and to the point of use by a conduit 408, and the receptacle 400 may be initially charged with a supply of water or other fluid by an inlet 410.

It is also possible to form the bag or membrane for receiving the milk concentrate in the shape of an expansible bellows 450 in the manner shown by Fig. 11 of the drawings, in which event, the same would be mounted in a receptacle 452 similar to the receptacle 20, the lid of the latter being provided with inlet and outlet conduits 454 and 456 respectively.

In Fig. 12 of the drawings, there is illustrated a dispensing machine 500 provided with a water supply tank 502 having its inlet conduit 504 extending through refrigerating unit 506 for pre-cooling of the water. A water tank 508 in the cabinet 500 receives water from the tank 502 by means of a line 510 that is in turn equipped with a float-controlled needle valve 512.

A container 514 for milk concentrate or other liquid is provided with a flexilbe diaphragm 516 having filter means 518 therein. Pumping means within the container 514 includes a cylinder 520 and a piston 522 provided with a stem 524 extending through and connected with the diaphragm 516. Inlet pipe 526 places the cylinder 520 in communication with the container 514 and outlet pipe 528 joined with the cylinder 520 extends through the diaphragm 516 for connection with a conduit 530, terminating in a nozzle 532 within a dispensing station 534.

A second pumping means takes the form of a cylinder 536 provided with a reciprocable piston 538 whose stem is in the form of a rack 540 meshing with an oscillatable gear 542. Another rack 544 connectable with the stem 524 also meshes with the gear 542 as does a plunger rack 546.

A line 548 having a check valve 550 therein, interconnects the tank 508 and cylinder 536 and a line 552 terminating in a nozzle 554 in station 534 also communicates with the cylinder 536 and has a one-way valve 556 therein.

Manifestly, the gear 542 is sufficiently wide to permit offsetting of the racks 540, 544 and 546, and thus, when the plunger rack 546 is reciprocated, like motion will be imparted to the racks 540 and 544 to reciprocate the pistons 538 and 522 respectively within their corresponding cylinders 536 and 520. Predetermined amounts of at least two liquids are dispensed through the structure of Fig. 12 simultaneously, depending upon the piston displacement of the two pumping apparatuses and it is seen that the pumping assembly within the container 514 may be disposed of if desired, to maintain sanitary conditions as is contemplated by all forms of the present invention.

It is now apparent that the dispensing machine of the present invention exploits the favorable characteristics of concentrated milk and has many advantages, particularly for use by the armed forces. It makes possible the utilization of high quality, low cost milk from the ever abundant Minnesota-Wisconsin milk shed in areas remote from such adequate supply. Through use of the dispensing machine hereof delivery costs may be substantially reduced by substituting semi-weekly or weekly deliveries for customary daily deliveries, reducing tonnage handled by as much as seventy-five percent. Milk bottles or cartons need not be handled since the dispenser will discharge milk directly into a tumbler. Milk may be served cold because of the refrigeration herein provided whether located in a public establishment, in the home or in canteens for the armed services.

Finally, the construction herein contemplated, permits the vending or dispensing of various other types of beverages such as iced tea, in which event a concentrated brew may be made and poured into a container such as at 16, and thereupon, when the machine is placed in use, diluted with ice-cold water making it possible to handle large numbers of individuals in cafes, restaurants, public gatherings or in the armed services.

Having thus described the invention, what is claimed as new and desired to be secured by Letters Patent is:

1. A liquid dispenser comprising a pair of liquid containers; pump means connected with one of said containers; a fluid receptacle; a collapsible, bag-like membrane disposed in said receptacle and connected with the other container; an outlet conduit for said pump means and said membrane respectively; a cylinder coupled with said receptacle; a piston reciprocably mounted in said cylinder for alternately pumping fluid into and out of said receptacle to contract and expand said membrane; and means for simultaneously actuating said pump means and said piston to draw predetermined amounts of liquids from said containers and expel the same through corresponding conduits.

2. A liquid dispenser comprising a pair of liquid containers; pump means connected with one of said containers; a fluid receptacle; a collapsible, bag-like membrane disposed in said receptacle and connected with the other container; an outlet conduit for said pump means and said membrane respectively; a reciprocable piston in said receptacle for alternately expanding and contracting said membrane; and means for simultaneously actuating said pump means and said piston to draw predetermined amounts of liquids from said containers and expel the same through corresponding conduits.

3. A liquid dispenser comprising a pair of liquid containers; a pair of pump means, one of said pump means being connected with one of said containers; a fluid receptacle; a collapsible, bag-like membrane disposed in said receptacle and connected with the other container; an outlet conduit for said one pump means and said membrane respectively; means coupling the other pump means with said receptacle for alternately expanding and contracting said membrane; and means for simultaneously actuating said pump means to draw predetermined amounts of liquids from said containers and expel the same through corresponding conduits.

4. A liquid dispenser as set forth in claim 3 wherein the pump means each include a cylinder having a reciprocable piston therein, the piston of the one pump means communicating with said one container, the cylinder of the other pump means communicating with the receptacle.

5. A liquid dispenser as set forth in claim 3 wherein said pump means each comprises a hollow, expansible member.

6. A liquid dispenser as set forth in claim 3 wherein said membrane comprises a hollow, pleated bellows.

7. A liquid dispenser comprising a dispensing station; a beverage container; a water tank; a fluid receptacle; a collapsible membrane mounted in the receptacle; an inlet conduit interconnecting the membrane and the container; an outlet conduit connected with the membrane and extending to said station; a cylinder communicating with the receptacle; a piston reciprocable in the cylinder for pumping liquid into and out of the receptacle to alternately contract and expand the membrane to draw charges of said beverage from the container and expel the same through the outlet conduit; and means for pumping a charge of water from said tank to said station each time the piston is actuated.

8. A liquid dispenser comprising a dispensing station; a beverage container; a fluid receptacle; a collapsible membrane mounted in the receptacle; an inlet conduit interconnecting the membrane and the container; an outlet conduit connected with the membrane and extending to said station; a cylinder communicating with the receptable; and a piston reciprocable in the cylinder for pumping liquid into and out of the receptacle to alternately contract and expand the membrane to draw charges of said beverage from the container and expel the same through the outlet conduit.

9. A liquid dispenser as set forth in claim 4 wherein said means for actuating the pumps includes a set of rotatable cams operably connected with each piston respectively, the cams of each set being of differing diameters, each set being shiftable for rendering the cams selectively operable.

10. A liquid dispenser as set forth in claim 1 wherein one of said conduits terminates in a flattened, normally closed, anti-drip nozzle, said nozzle being flexible for opening in response to the force of liquid therethrough.

11. A liquid dispenser as set forth in claim 10 wherein the other conduit is disposed to discharge against the nozzle to bathe the same with the liquid emanating from the other conduit.

12. A liquid dispenser as set forth in claim 3 wherein said membrane has a substantially V-shaped cross-sectional contour.

References Cited in the file of this patent

UNITED STATES PATENTS

| | | |
|---|---|---|
| 1,934,623 | Frick | Nov. 7, 1933 |
| 2,372,360 | Cornelius | Mar. 27, 1945 |
| 2,502,610 | Wegman | Apr. 4, 1950 |
| 2,536,400 | Thompson | Jan. 2, 1951 |
| 2,538,111 | Luster | Jan. 16, 1951 |
| 2,657,628 | Von Stoeser | Nov. 3, 1953 |